US012623399B2

(12) United States Patent
Chan

(10) Patent No.: US 12,623,399 B2
(45) Date of Patent: May 12, 2026

(54) PORTABLE 3D PRINTER FILAMENT EXTRUDER FOR KIDS AND METHOD OF FORMING 3D PRINTER FILAMENT THEREOF

(71) Applicant: Henry Wai Chaing Chan, Palo Alto, CA (US)

(72) Inventor: Henry Wai Chaing Chan, Palo Alto, CA (US)

(73) Assignee: Henry Wai Chaing Chan, Palo Alto, CA (US)

( * ) Notice: Subject to any disclaimer, the term of this patent is extended or adjusted under 35 U.S.C. 154(b) by 488 days.

(21) Appl. No.: 18/305,072

(22) Filed: Apr. 21, 2023

(65) Prior Publication Data

US 2024/0351270 A1     Oct. 24, 2024

(51) Int. Cl.
*B29C 64/118* (2017.01)
*B29C 64/209* (2017.01)
*B29C 64/295* (2017.01)
*B29C 64/30* (2017.01)

(52) U.S. Cl.
CPC .......... *B29C 64/118* (2017.08); *B29C 64/209* (2017.08); *B29C 64/295* (2017.08); *B29C 64/30* (2017.08)

(58) Field of Classification Search
CPC ... B29C 64/118; B29C 64/295; B29C 64/209; B29C 64/30
See application file for complete search history.

(56) References Cited

U.S. PATENT DOCUMENTS

| | | | |
|---|---|---|---|
| 2014/0271964 A1* | 9/2014 | Roberts, IV | .......... B29C 64/393 |
| | | | 425/150 |
| 2015/0174824 A1* | 6/2015 | Gifford | ................. B29C 64/245 |
| | | | 425/183 |
| 2020/0361136 A1* | 11/2020 | Fenn | .................... C09D 175/02 |

* cited by examiner

*Primary Examiner* — Gary Collins
(74) *Attorney, Agent, or Firm* — Rabin & Berdo, P.C.

(57) ABSTRACT
A portable 3D printer filament extruder for kids includes a chamber, a nozzle, a heating element and a pump. The chamber has a space configured to store raw materials. The nozzle is connected with the chamber. The nozzle has an opening communicated with the space. The heating element is disposed on the chamber and configured to heat up the raw materials in the space. The pump is connected with the chamber and configured to provide pressure to the space to extrude the heated raw materials out of the chamber through the opening in a form of filament.

18 Claims, 8 Drawing Sheets

M

PORTABLE 3D PRINTER FILAMENT EXTRUDER FOR KIDS AND METHOD OF FORMING 3D PRINTER FILAMENT THEREOF

BACKGROUND

Technical Field

The present disclosure relates to portable 3D printer filament extruders for kids. More particularly, the present disclosure relates to portable 3D printer filament extruders for kids which can form 3D printer filaments from ground raw materials.

Description of Related Art

In recent years, due to the advantage of formation of different structures in a precise and convenient manner, 3D printing has been widely applied in different aspects. Correspondingly, most of the machines or equipment involved in 3D printing are large and heavy.

As the applications of 3D printing become more popular, there gradually appear toys of 3D printing for children in the market.

When playing a toy of 3D printing, 3D printer filaments are constantly input into the toy in order to form different art works. Since 3D printer filaments are consumables, how to make the process of playing 3D printing become environmental friendly is undoubtedly an important issue which the industry highly concerns. For example, a portable device which can recycle the filament residues or unwanted art works would be greatly beneficial.

SUMMARY

A technical aspect of the present disclosure is to provide a portable 3D printer filament extruder for kids, which can form 3D printer filaments from ground raw materials in a manual and safe way.

According to an embodiment of the present disclosure, a portable 3D printer filament extruder for kids includes a chamber, a nozzle, a heating element and a pump. The chamber has a space configured to store raw materials. The nozzle is connected with the chamber. The nozzle has an opening communicated with the space. The heating element is disposed on the chamber and configured to heat up the raw materials in the space. The pump is connected with the chamber and configured to provide pressure to the space to extrude the heated raw materials out of the chamber through the opening in a form of filament.

In one or more embodiments of the present disclosure, the pump is a hand pump.

In one or more embodiments of the present disclosure, the chamber includes a first body, a second body and a hinge. The first body is connected with the nozzle. The heating element is disposed on the first body. The second body seals the space together with the first body. The pump is connected with the second body. The hinge is connected between the first body and the second body.

In one or more embodiments of the present disclosure, the chamber further includes a first locking portion and a second locking portion. The first locking portion includes a first hook, a first elastic element and a first conductive piece. The first elastic element is connected between the first hook and the first body. The first conductive piece is disposed on the first hook. The second locking portion includes a second hook, a second elastic element and a second conductive piece. The second hook is configured to snap with the first hook. The second elastic element is connected between the second hook and the second body. The second conductive piece is disposed on the second hook and configured to contact with the first conductive piece when the second hook snaps with the first hook. The portable 3D printer filament extruder for kids further includes a controlling unit. The controlling unit is electrically connected with the first conductive piece, the second conductive piece and the heating element. The controlling unit is configured to control the heating element.

In one or more embodiments of the present disclosure, the chamber further includes a thermal lock. The thermal lock is disposed on the first body and located in the space. The first locking portion is at least partially located between the thermal lock and the second locking portion. The thermal lock is configured to at least partially expand when the thermal lock reaches a predetermined temperature and press to secure the first hook to the second hook.

In one or more embodiments of the present disclosure, the portable 3D printer filament extruder for kids further includes a capacity sensor. The capacity sensor is disposed at a level marker inside the first body and signally connected with the controlling unit. The capacity sensor is configured to provide a signal to the controlling unit when the raw materials exceed the level marker. The controlling unit is restricted from turning on the heating element when receiving the signal.

In one or more embodiments of the present disclosure, the portable 3D printer filament extruder for kids further includes a temperature sensor and a temperature meter. The temperature sensor is disposed inside the first body and configured to detect a temperature in the chamber. The temperature meter is signally connected with the temperature sensor and configured to display a magnitude of the temperature detected by the temperature sensor.

In one or more embodiments of the present disclosure, the portable 3D printer filament extruder for kids further includes a power supply, a frame, a plurality of supporting legs and at least one emergency switch. The power supply is connected with the heating element. The first body is mounted on the frame. The supporting legs are respectively connected with the frame and configured to be positioned on a flat surface. The emergency switch is disposed at an end of one of the supporting legs away from the frame. The emergency switch is electrically connected between the power supply and the heating element. The emergency switch is configured to electrically disconnect the power supply and the heating element when the emergency switch is free from compression.

In one or more embodiments of the present disclosure, the portable 3D printer filament extruder for kids further includes a plurality of fans. The fans are disposed on the frame. The nozzle is at least partially located between first body and the fans. The fans surround a vicinity of the opening. The fans are signally connected to the controlling unit. The controlling unit is further configured to control the fans. The emergency switch is electrically connected between the power supply and the fans. The emergency switch is configured to electrically disconnect the power supply and the fans when the emergency switch is free from compression.

In one or more embodiments of the present disclosure, the portable 3D printer filament extruder for kids further includes a cooling device and a heat-resistant exhaust hose.

The heat-resistant exhaust hose is connected between the cooling device and the first body.

A technical aspect of the present disclosure is to provide a method of forming 3D printer filament, which can form 3D printer filaments from ground raw materials in a manual and safe way.

According to an embodiment of the present disclosure, a method of forming 3D printer filament includes: putting ground raw materials into a chamber; closing the chamber; heating up to melt the ground raw materials; and manually increasing a pressure inside the chamber to extrude the melted ground raw materials out of the chamber through a nozzle to form a filament.

In one or more embodiments of the present disclosure, the method further includes cooling down the filament.

In one or more embodiments of the present disclosure, the method further includes delivering steam formed from heating the ground raw materials to a cooling device away from the chamber through a heat-resistant exhaust hose.

In one or more embodiments of the present disclosure, the method further includes displaying a magnitude of a temperature detected by a temperature sensor disposed inside the chamber.

In one or more embodiments of the present disclosure, the method further includes activating an emergency switch located at a bottom of the chamber to shut off a power supply configured for heating up the ground raw materials when the emergency switch is separated from a flat surface.

In one or more embodiments of the present disclosure, the chamber includes a first locking portion and a second locking portion. The first locking portion includes a first hook and a first conductive piece. The first hook is elastically connected to the first body. The first conductive piece is disposed on the first hook. The second locking portion includes a second hook and a second conductive piece. The second hook is elastically connected to the second body and configured to snap with the first hook. The second conductive piece is disposed on the second hook and configured to contact with the first conductive piece when the second hook snaps with the first hook. The procedure of closing the chamber includes: snapping the first hook to the second hook, such that the first conductive piece and the second conductive piece contact with each other to form a complete electric circuit with a controlling unit. The procedure of heating up the ground raw materials includes: controlling by the controlling unit to heat up the ground raw materials after the complete electric circuit is formed.

In one or more embodiments of the present disclosure, the procedure of heating up the ground raw materials further includes: thermally expanding a thermal lock disposed inside the chamber, such that the thermal lock presses on the first locking portion to secure the snapping of the first locking portion to the second locking portion.

In one or more embodiments of the present disclosure, the procedure of putting the ground raw materials includes: sending a signal to a controlling unit by a capacity sensor disposed at a level marker inside the chamber when the ground raw materials exceed the level marker; and restricting from heating the ground raw materials when the controlling unit receives the signal.

The above-mentioned embodiments of the present disclosure have at least the following advantages:

(1) Since the pump is a hand pump, the pressure in the chamber can be developed manually. Therefore, the 3D printer filament can be extruded out of the chamber through the opening of the nozzle in a manual way, which is suitable to be operated by kids.

(2) Since the pump is a hand pump, the overall size and weight of the portable 3D printer filament extruder for kids are effectively reduced. Therefore, the portable 3D printer filament extruder for kids is suitable to be portable.

(3) As a safety measure, the emergency switch electrically disconnects the power supply, the heating element and the fans in an instant manner when the emergency switch is separated from the flat surface such that the emergency switch is free from compression.

(4) Apart from the snapping between the first locking portion and the second locking portion, the thermal lock provides an additional security to prevent the second body from loosening from the first body to open the chamber when the temperature of the space has already increased.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
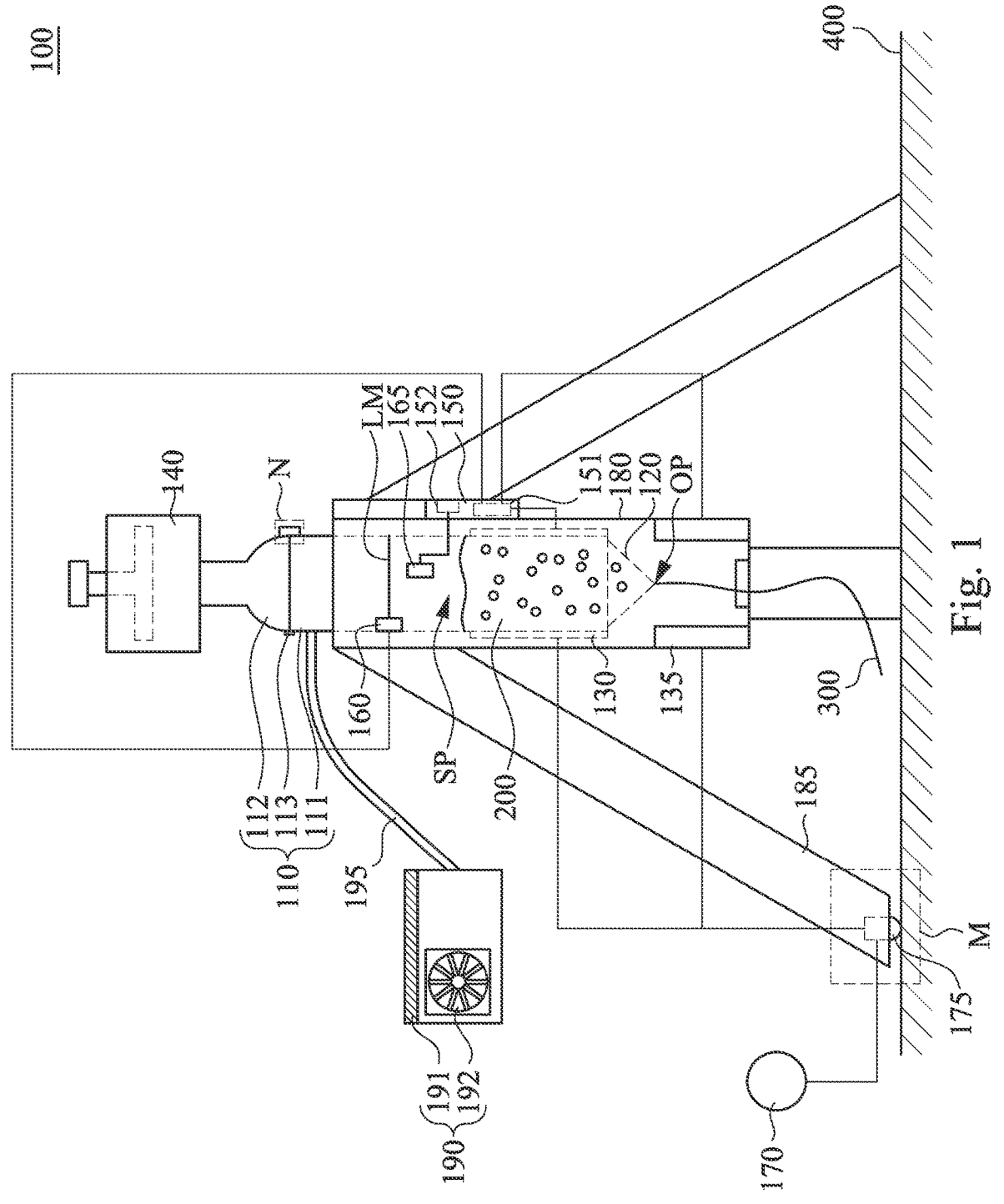
FIG. 1 is a partially sectional view of a portable 3D printer filament extruder for kids according to some embodiments of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a partially sectional view of a portable 3D printer filament extruder for kids 100 according to some embodiments of the present disclosure. In this embodiment, as shown in FIG. 1, a portable 3D printer filament extruder for kids 100 includes a chamber 110, a nozzle 120, a heating element 130 and a pump 140. The chamber 110 has a space SP configured to store raw materials 200. In practice, the raw materials 200 can be particles of polylactic acid (PLA) which are ground into dimensions of less than 3 mm. The nozzle 120 is connected with the chamber 110. The nozzle 120 has an opening OP communicated with the space SP of the chamber 110. The heating element 130 is disposed on the chamber 110 and is configured to heat up the raw materials 200 in the space SP such that the raw materials 200 can be melted. The pump 140 is connected with the chamber 110 and is configured to provide pressure to the space SP in order to extrude the melted raw materials 200 out of the chamber 110 through the opening OP of the nozzle 120 in a form of filament. Since PLA is a material suitable for 3D printing, this means a 3D printer filament 300 can be formed by the portable 3D printer filament extruder for kids 100.

It is worth to note that, in this embodiment, the pump 140 is a hand pump. In this way, the pressure in the chamber 110 can be developed manually. In other words, the 3D printer filament 300 can be extruded out of the chamber 110 through the opening OP of the nozzle 120 in a manual way, which is suitable to be operated by kids.

Moreover, since the pump 140 is a hand pump, the overall size and weight of the portable 3D printer filament extruder for kids 100 are effectively reduced. Therefore, the portable 3D printer filament extruder for kids 100 is suitable to be portable.

In addition, the portable 3D printer filament extruder for kids 100 further includes a controlling unit 151. The controlling unit 151 is signally connected with the heating element 130 and is configured to control the heating element 130. This means the heating element 130 can be turned on or off by the controlling unit 151. In practice, the controlling unit 151 can be turned on or off by a switch 155 (please see FIG. 4 for the switch 155) signally connected with the controlling unit 151. Furthermore, the controlling unit 151 and the switch 155 can be practically disposed on a control panel 150.

To be specific, as shown in FIG. 1, the chamber 110 includes a first body 111, a second body 112 and a hinge 113. The first body 111 is connected with the nozzle 120. The heating element 130 is disposed on the first body 111. The second body 112 to configured to seal the space SP together with the first body 111. The pump 140 is connected with the second body 112. The hinge 113 is connected between the first body 111 and the second body 112 such that the second body 112 can rotate relative to the first body 111 to open or close the chamber 110.

Moreover, as shown in FIG. 1, the portable 3D printer filament extruder for kids 100 further includes a capacity sensor 160. The capacity sensor 160 is disposed at a level same as a level marker LM inside the first body 111 and is signally connected with the controlling unit 151. In practice, the level marker LM is a reference line for a maximum amount of raw materials 200 allowed to be stored in the space SP of the chamber 110. The capacity sensor 160 is configured to provide a signal to the controlling unit 151 when the amount of the raw materials 200 in the space SP is too much and a height of the raw materials 200 exceed the level marker LM. As a safety measure, the controlling unit 151 is restricted from turning on the heating element 130 when receiving the signal from the capacity sensor 160. Furthermore, the capacity sensor 160 is further connected electrically to an indicator light 153 (please see FIG. 4 for the indicator light 153), which can be practically disposed on the control panel 150. In practice, when the capacity sensor 160 provides a signal to the controlling unit 151, the capacity sensor 160 also lights up the indicator light 153 for drawing the attention from the user.

In this embodiment, as shown in FIG. 1, the portable 3D printer filament extruder for kids 100 further includes a power supply 170, a frame 180, a plurality of supporting legs 185 and at least one emergency switch 175. The power supply 170 is connected with the heating element 130 and is configured to provide power to the heating element 130. The control panel 150 and the first body 111 of the chamber 110 are mounted on the frame 180. The supporting legs 185 are respectively connected with the frame 180 and are configured to be positioned on a flat surface 400, such that the portable 3D printer filament extruder for kids 100 can be properly placed on the flat surface 400 in a stable manner. In practice, the flat surface 400 can be, but not limited to, a floor or a top surface of a table. Moreover, for example, a quantity of the supporting legs 185 can be three or four. The emergency switch 175 is disposed at an end of at least one of the supporting legs 185 away from the frame 180 and is electrically connected between the power supply 170 and the heating element 130. When the portable 3D printer filament extruder for kids 100 is in a proper position, the emergency switch 175 is pressed against the flat surface 400.

Figure 2:
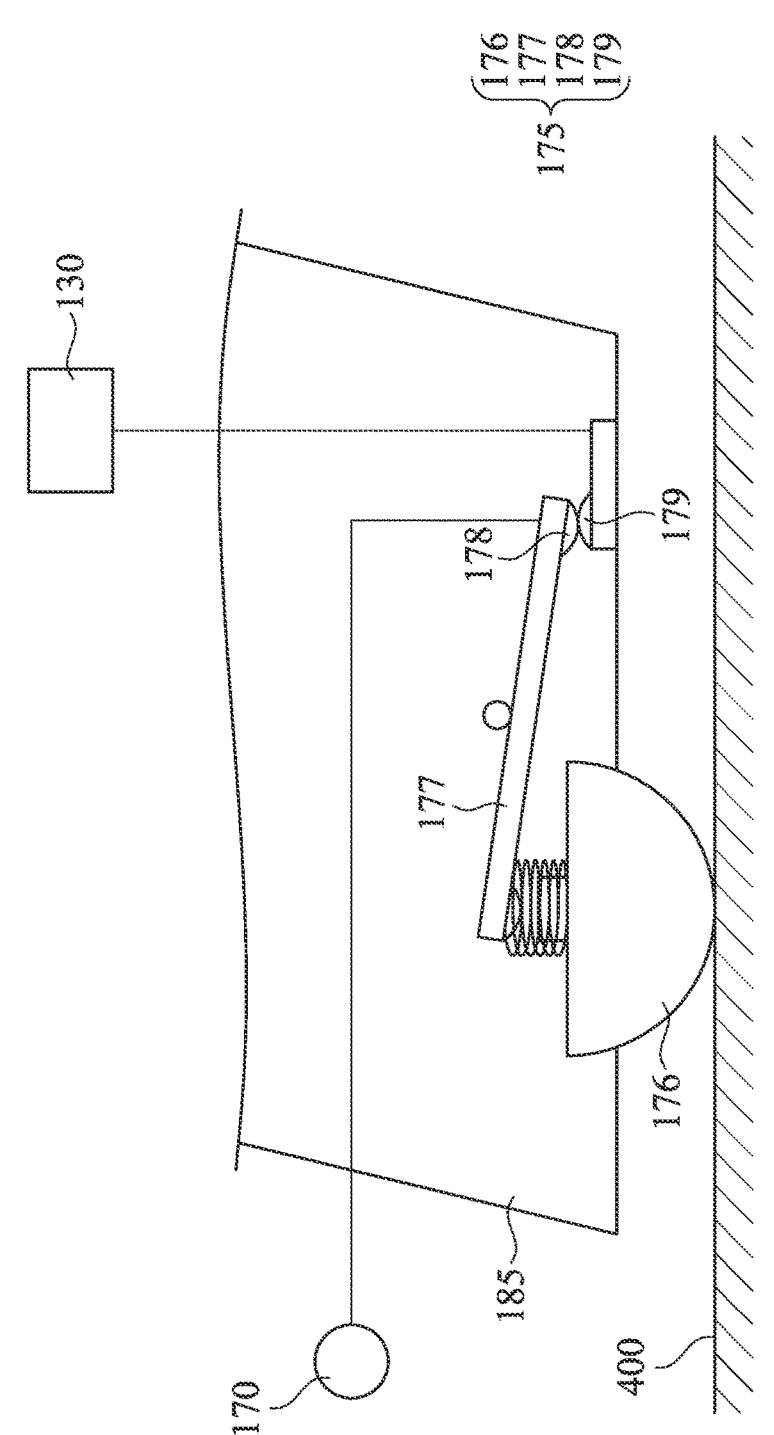
FIG. 2 is an enlarged sectional view of the zone M of FIG. 1.

Reference is made to FIG. 2. FIG. 2 is an enlarged sectional view of the zone M of FIG. 1. In this embodiment, as shown in FIG. 2, the emergency switch 175 is pressed against the flat surface 400 and is electrically connected between the power supply 170 and the heating element 130. In this status of the emergency switch 175, the power supply 170 can supply power to the heating element 130 through the emergency switch 175. For the sake of drawing simplification, the power supply 170 and the heating element 130 are schematically presented in FIG. 2. In practice, for example, the emergency switch 175 includes a button 176, a lever 177, a first connecting point 178 and a second connecting point 179. The lever 177 is connected between the button 176 and the first connecting point 178. When the button 176 is pressed against the flat surface 400, the first connecting point 178 moves to contact with the second connecting point 179 under the rotational movement of the level 177, such that the power supply 170 and the heating element 130 are electrically connected to each other. However, this structural arrangement of the emergency switch 175 is only illustrative and does not intend to limit the present disclosure. The person having ordinary skill in the art may choose an appropriate type of the emergency switch 175 according to the actual situations.

Figure 3:
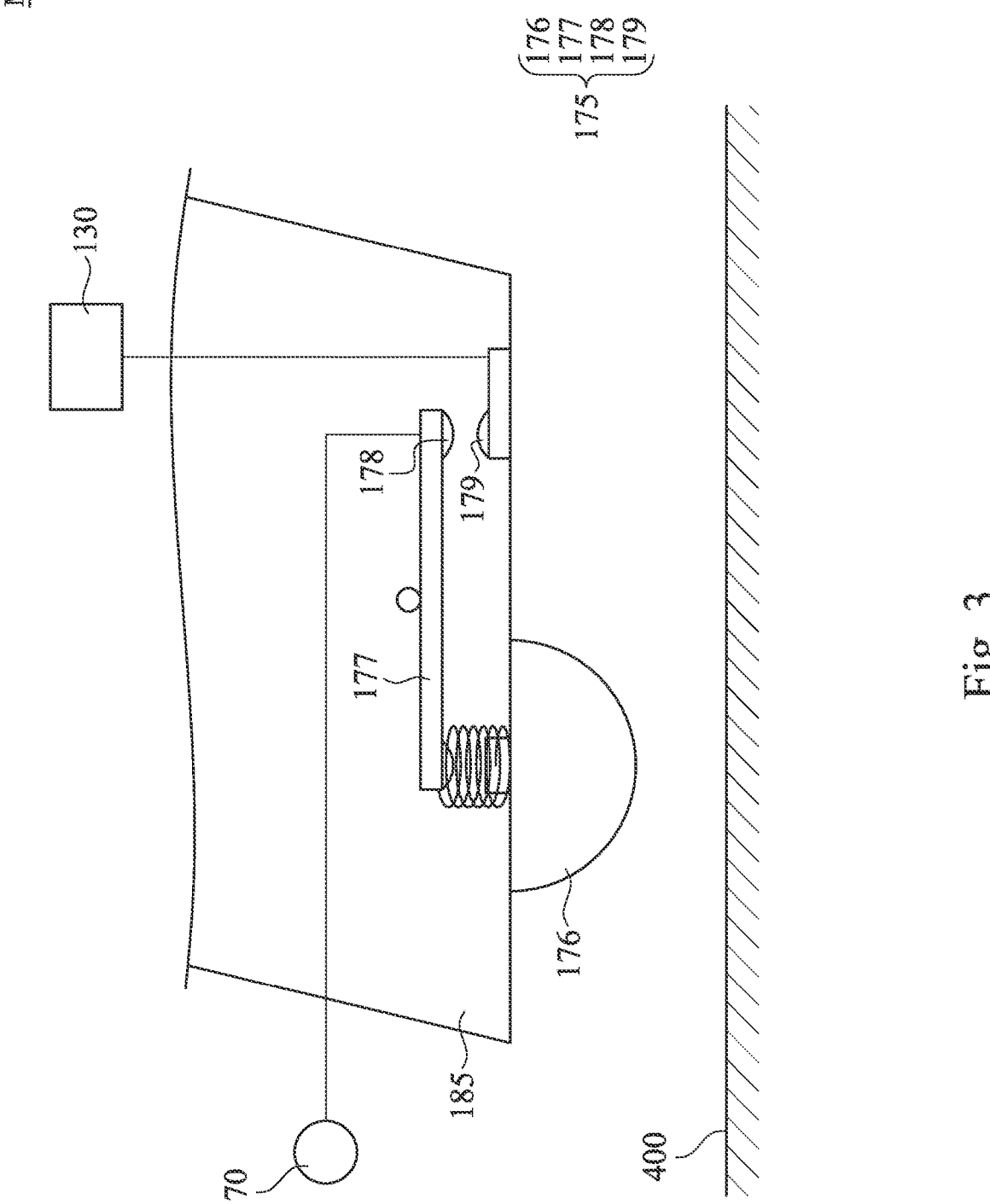
FIG. 3 is an enlarged sectional view of the zone M of FIG. 1.

Reference is made to FIG. 3. FIG. 3 is an enlarged sectional view of the zone M of FIG. 1, in which the emergency switch 175 is separated from the flat surface 400. As shown in FIG. 3, the button 176 of the emergency switch 175 is separated from the flat surface 400. In such condition that the emergency switch 175 is free from compression, as a safety measure, the first connecting point 178 is separated from the second connecting point 179, and the emergency switch 175 electrically disconnects the power supply 170 and the heating element 130 in an instant manner. For example, the emergency switch 175 is separated from the flat surface 400 when the flat surface 400 collapses or when the portable 3D printer filament extruder for kids 100 falls down or is lifted up from the flat surface 400. Similarly, the power supply 170 and the heating element 130 are also schematically presented in FIG. 3.

Furthermore, in this embodiment, as shown in FIG. 1, the portable 3D printer filament extruder for kids 100 further includes a plurality of fans 135. The fans 135 are disposed on the frame 180 and surround a vicinity of the opening OP. The nozzle 120 is at least partially located between the first body 111 and the fans 135. The fans 135 are signally connected to the controlling unit 151. The controlling unit 151 is further configured to control the fans 135. This means the fans 135 can be turned on or off by the controlling unit 151. Moreover, the emergency switch 175 is electrically connected between the power supply 170 and the fans 135. Similarly, as a safety measure, the emergency switch 175 is configured to electrically disconnect the power supply 170 and the fans 135 in an instant manner when the emergency switch 175 is separated from the flat surface 400 such that the emergency switch 175 is free from compression.

In addition, in this embodiment, as shown in FIG. 1, the portable 3D printer filament extruder for kids 100 further includes a cooling device 190 and a heat-resistant exhaust hose 195. The heat-resistant exhaust hose 195 is connected between the cooling device 190 and the first body 111 of the chamber 110. When the raw materials 200 are heated up in the space SP of the chamber 110, hot steam may be produced from the raw materials 200. The hot steam is then delivered to the cooling device 190 for cooling through the heat-resistant exhaust hose 195. In practical application, the cooling device 190 can include a fan 192, which creates a negative pressure to accelerate the hot steam to be collected into the cooling device 190. Moreover, the cooling device 190 can further include a grate 191 disposed on a surface of the cooling device 190 as a filter. Since the heat-resistant exhaust hose 195 is resistant to heat, heat from the hot steam cannot reach the outer surface of the heat-resistant exhaust hose 195, which is safe for the user. Moreover, for example, the heat-resistant exhaust hose 195 can be formed from a combination of an outer layer and an inner layer disposed inside the outer layer, while the outer layer made of silicone and the inner layer made of polyetherimide (PEI) fiber. However, this does not intend to limit the present disclosure.

On the other hand, as shown in FIG. 1, the portable 3D printer filament extruder for kids 100 further includes a temperature sensor 165 and a temperature meter 152. The temperature sensor 165 is disposed inside the first body 111 and is configured to detect a temperature in the space SP of the chamber 110. The temperature meter 152 is signally connected with the temperature sensor 165 and is configured to display a magnitude of the temperature detected by the temperature sensor 165. In practice, the temperature meter 152 is disposed on the control panel 150.

Figure 4:
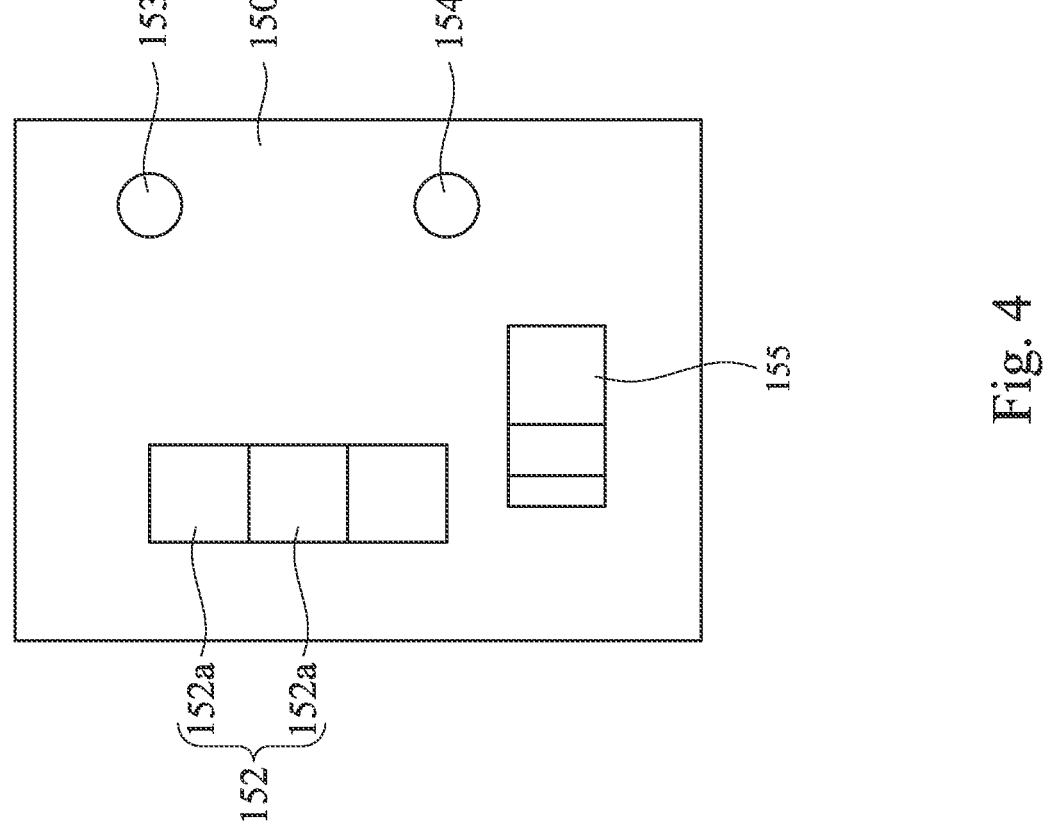
FIG. 4 is a front view of the control panel of FIG. 1.

Reference is made to FIG. 4. FIG. 4 is a front view of the control panel 150 of FIG. 1. As shown in FIG. 4, for example, the temperature meter 152 includes a plurality of LEDs 152a which are successively lighted up when the temperature detected by the temperature sensor 165 gradually increases. When the maximum temperature of 180 degree Celsius, for example, in the space SP of the chamber 110 is reached, all LEDs 152a are lighted up. At this point, a user may start to use the pump 140 to manually develop pressure in the space SP in order to extrude the melted raw materials 200 out of the chamber 110 through the opening OP of the nozzle 120 to form the 3D printer filament 300.

Figure 5:
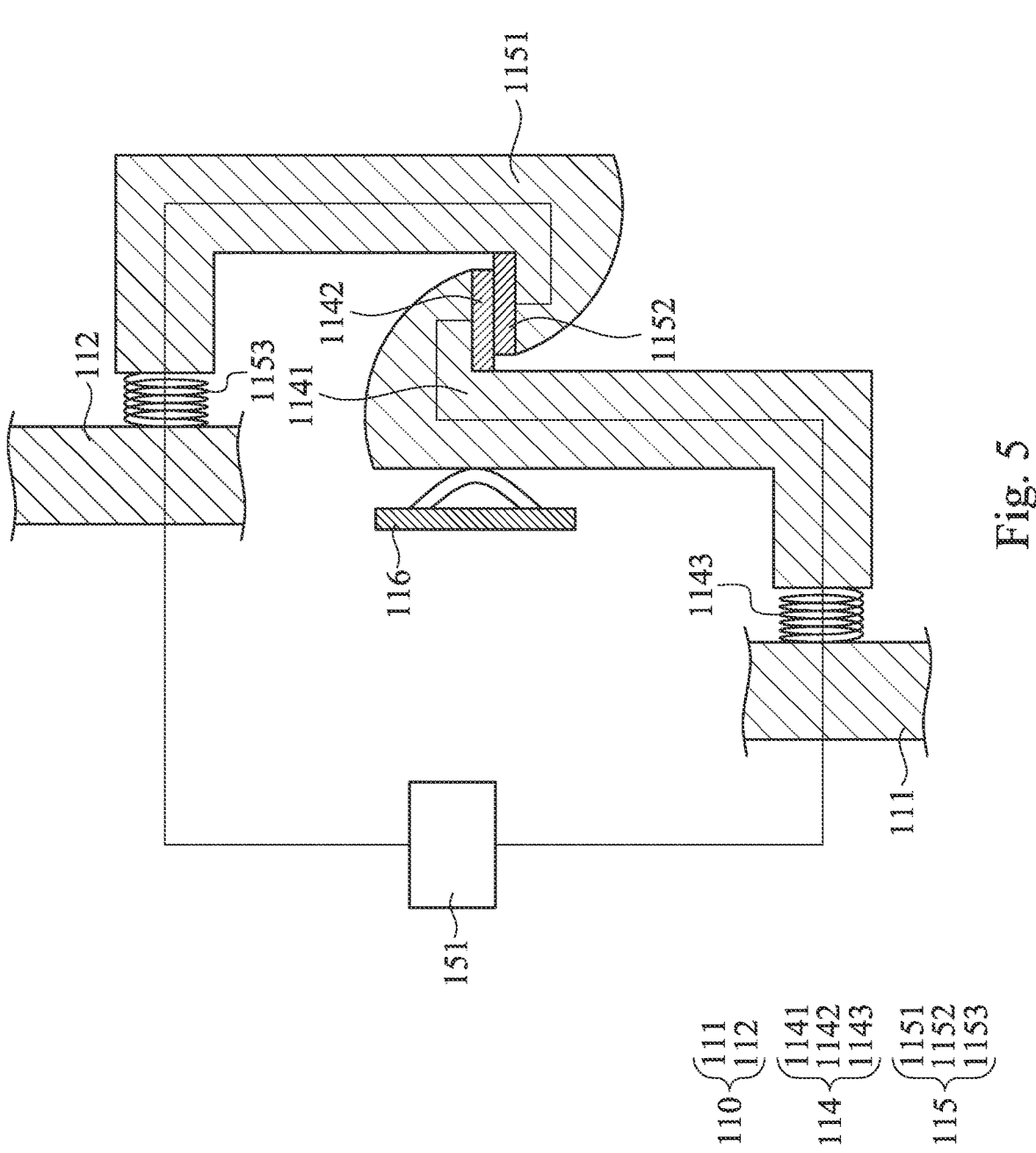
FIG. 5 is an enlarged sectional view of the zone N of FIG. 1.

Reference is made to FIG. 5. FIG. 5 is an enlarged sectional view of the zone N of FIG. 1. In this embodiment, as shown in FIG. 5, the chamber 110 further includes a first locking portion 114 and a second locking portion 115. The first locking portion 114 includes a first hook 1141, a first elastic element 1143 and a first conductive piece 1142. The first elastic element 1143 is connected between the first hook 1141 and the first body 111 (the first body 111 is partially shown in FIG. 5 for drawing simplification), such that the first hook 1141 is elastically connected to the first body 111. In practice, for example, the first elastic element 1143 can be a spring. The first conductive piece 1142 is disposed on the first hook 1141. The second locking portion 115 includes a second hook 1151, a second elastic element 1153 and a second conductive piece 1152. The second hook 1151 configured to snap with the first hook 1141. The second elastic element 1153 is connected between the second hook 1151 and the second body 112 (the second body 112 is partially shown in FIG. 5 for drawing simplification), such that the second hook 1151 is elastically connected to the second body 112. In practice, for example, the second elastic element 1153 can be a spring. In addition, as shown in FIG. 5, the first elastic element 1143 and the second elastic element 1153 are elastically stretchable along the same direction substantially in a parallel way. The second conductive piece 1152 is disposed on the second hook 1151 and configured to contact with the first conductive piece 1142 when the second hook 1151 snaps with the first hook 1141. Moreover, the controlling unit 151 is electrically connected with the first conductive piece 1142 and the second conductive piece 1152. For the sake of drawing simplification, the controlling unit 151 is schematically presented in FIG. 5. When the first locking portion 114 and the second locking portion 115 are properly snapped with each other such that the second conductive piece 1152 contacts with the first conductive piece 1142, a complete electric circuit is formed with the controlling unit 151, the first conductive piece 1142 and the second conductive piece 1152 electrically connected with each other. Moreover, the complete electric circuit is further connected electrically to an indicator light 154 (please see FIG. 4 for the indicator light 154), which can be practically disposed on the control panel 150. In practice, when the complete electric circuit mentioned above is formed, the indicator light 154 will light up for drawing the attention from the user.

In addition, as shown in FIG. 5, the chamber 110 further includes a thermal lock 116. The thermal lock 116 is disposed on the first body 111 and located in the space SP of the chamber 110. The first hook 1141 of the first locking portion 114 is at least partially located between the thermal lock 116 and the second hook 1151 of the second locking portion 115. The thermal lock 116 is configured to at least partially expand when the thermal lock 116 reaches a predetermined temperature and press to secure the first hook 1141 to the second hook 1151.

Figure 7:
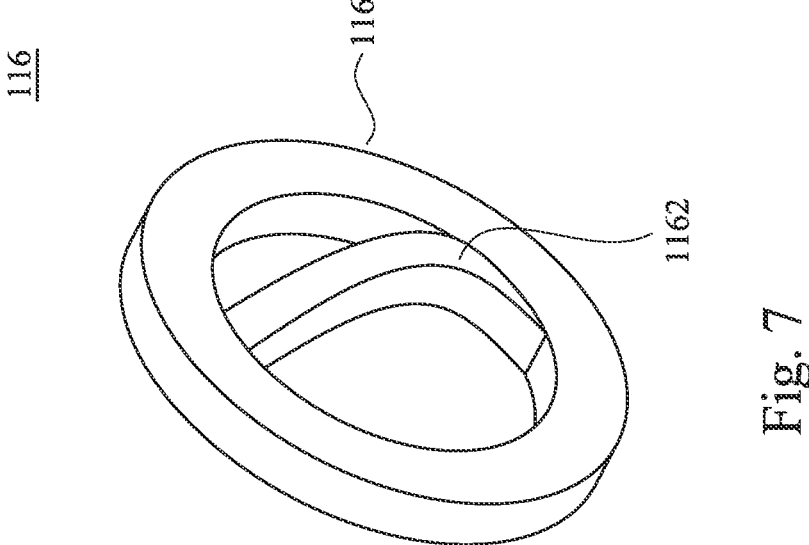
FIG. 7 is a schematic view of the thermal lock of FIG. 5, in which the thermal lock is at least partially and thermally expanded.
Figure 6:
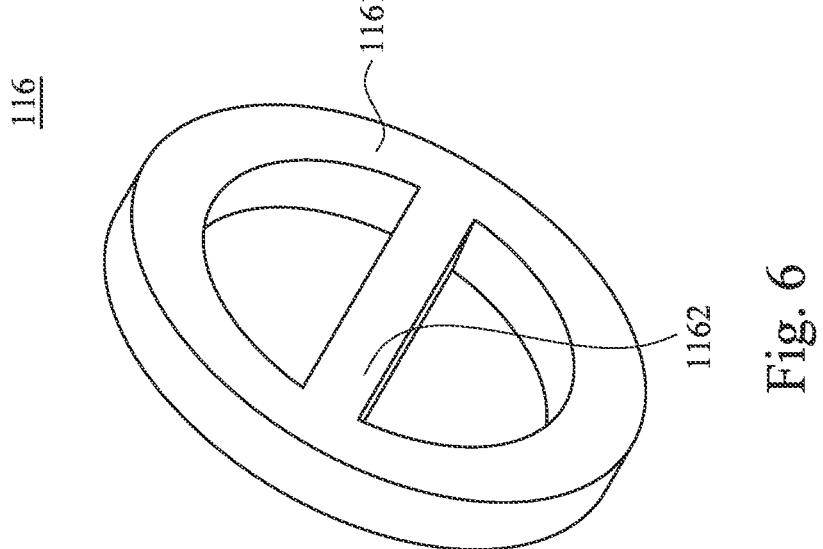
FIG. 6 is a schematic view of the thermal lock in FIG. 5.

Reference is made to FIGS. 6-7. FIG. 6 is a schematic view of the thermal lock 116 in FIG. 5. FIG. 7 is a schematic view of the thermal lock 116 of FIG. 5, in which the thermal lock 116 is at least partially and thermally expanded. For example, as shown in FIGS. 6-7, the thermal lock 116 includes an annular portion 1161 and a thermally expandable portion 1162 disposed within the annular portion 1161. When the space SP of the chamber 110 reaches a predetermined temperature, the thermally expandable portion 1162 at least partially expands as shown in FIG. 7 and presses against the first hook 1141 in order to secure the first hook 1141 to the second hook 1151 (please see FIG. 5 for the first hook 1141 and the second hook 1151). In this way, apart from the snapping between the first locking portion 114 and the second locking portion 115, the thermal lock 116 provides an additional security to prevent the second body 112 from loosening from the first body 111 to open the chamber 110 when the temperature of the space SP has already increased.

Figure 8:
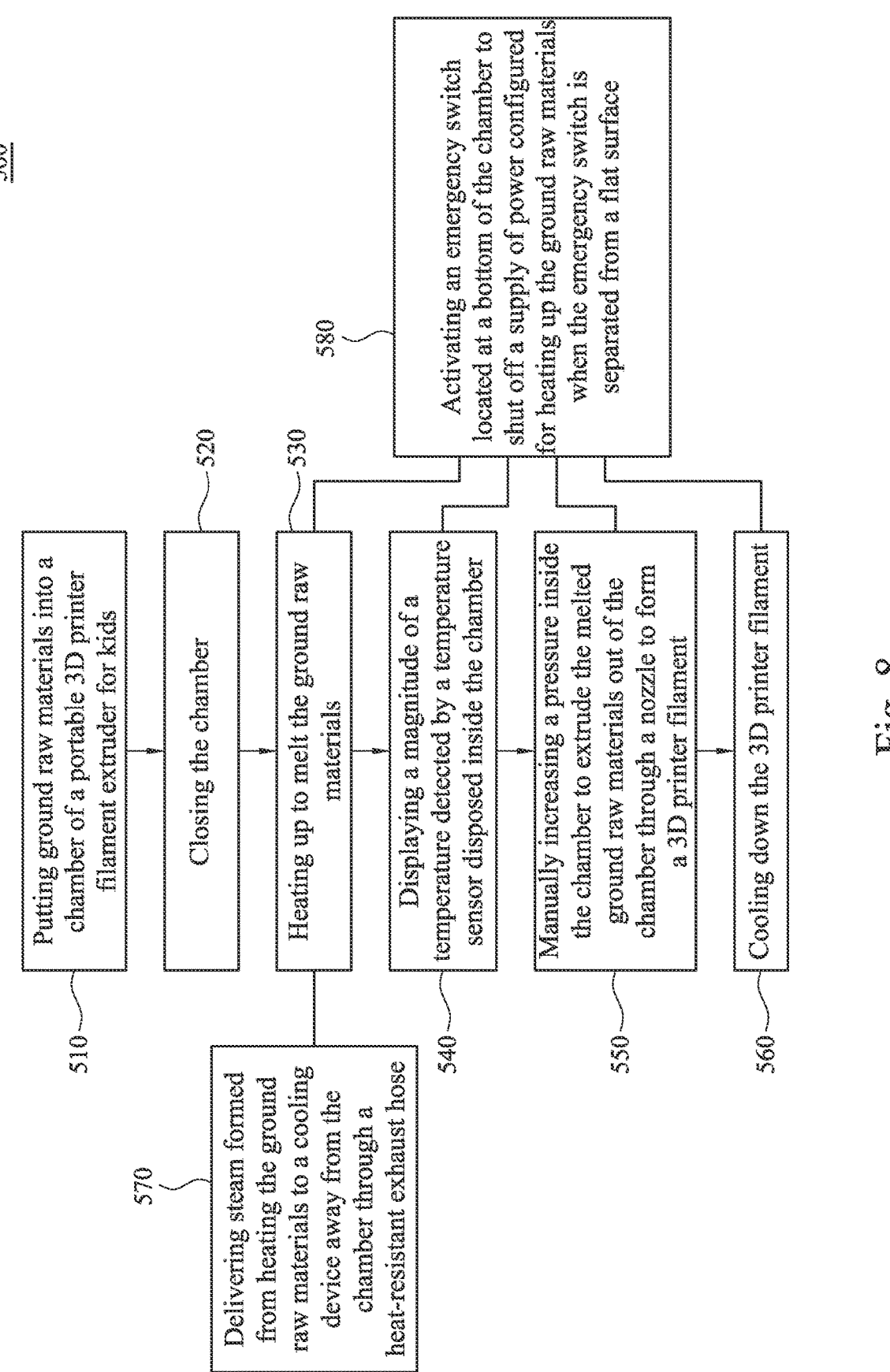
FIG. 8 is a flow diagram of a method of forming 3D printer filament according to an embodiment of the present disclosure.
Figure 9:
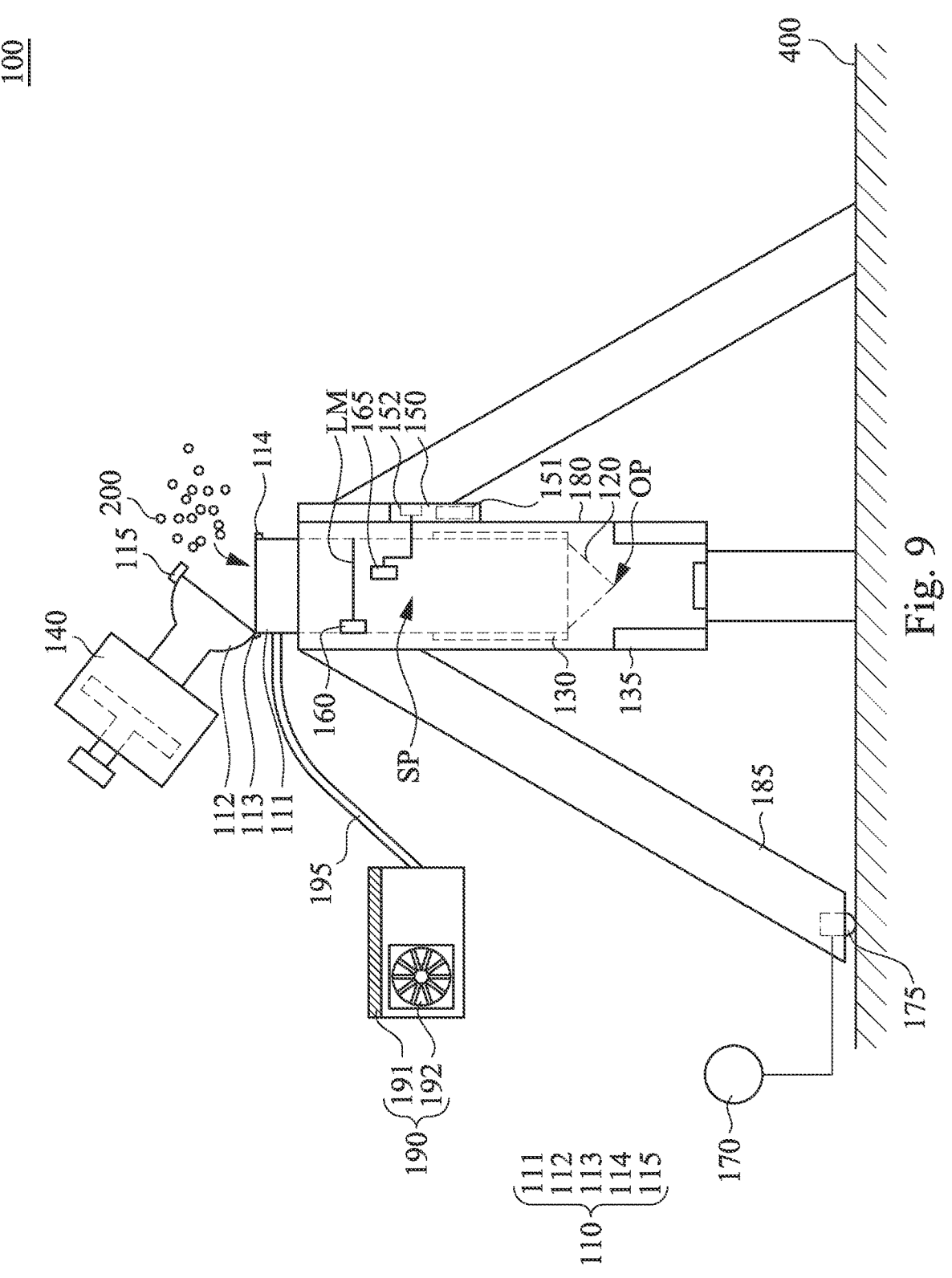
FIG. 9 is a presentation showing an operation of the portable 3D printer filament extruder for kids of FIG. 1, in which ground raw materials are being put into the chamber.

Reference is made to FIG. 8. FIG. 8 is a flow diagram of a method 500 of forming 3D printer filament 300 according to an embodiment of the present disclosure. In this embodiment, as shown in FIG. 8, a method 500 of forming 3D printer filament 300 includes the following procedures (it is appreciated that the sequence of the procedures and the sub-procedures as mentioned below, unless otherwise specified, can all be adjusted upon the actual needs, or even executed at the same time or partially at the same time):

(1) Putting the ground raw materials 200 into the chamber 110 of the portable 3D printer filament extruder for kids 100 (Procedure 510). Reference is made to FIG. 9. FIG. 9 is a presentation showing an operation of the portable 3D printer filament extruder for kids 100 of FIG. 1, in which ground raw materials 200 are being put into the chamber 110 of the portable 3D printer filament extruder for kids 100. For the sake of drawing simplification, except the electrical connection between the power supply 170 and the emergency switch 175, other electrical connections and signal connections as mentioned above are omitted in FIG. 9. Moreover, as shown in FIG. 9, the second body 112 is rotated relative to the first body 111 and the chamber 110 is opened. Moreover, for the sake of safety, the amount of the ground raw materials 200 to be put into the chamber 110 should avoid from exceeding the level marker LM inside the first body 111. Otherwise, the capacity sensor 160 disposed at the level marker LM will send a signal to the controlling unit 151, and the controlling unit 151 will correspondingly restrict the heating element 130 from heating up.

(2) Closing the chamber 110 (Procedure 520). As shown in FIG. 1, the chamber 110 is closed by rotating the second body 112 relative to the first body 111 and snapping the first hook 1141 to the second hook 1151 as described above (please refer to FIG. 5), such that the first conductive piece 1142 and the second conductive piece 1152 contact with each other to form a complete electric circuit with the controlling unit 151.

(3) Heating up to melt the ground raw materials 200 (Procedure 530). After the complete electric circuit is formed, the indicator light 154 will light up, and the user can turn on the switch 155 on the control panel 150 to allow the controlling unit 151 to control the heating element 130 to heat up, such that the ground raw materials 200 in the space SP start to melt. When the temperature in the space SP increases, the thermal lock 116 disposed inside the chamber 110 is also heated up and thermally expands. Until the thermal lock 116 reaches a predetermined temperature, the thermal lock 116 presses on the first locking portion 114 to secure the snapping of the first locking portion 114 to the second locking portion 115.

(4) Displaying a magnitude of a temperature detected by the temperature sensor 165 disposed inside the chamber 110 (Procedure 540). For example, as described above, the magnitude of the temperature in the space SP can be displayed by the temperature meter 152. When it is known from the LEDs 152 of the temperature meter 152 that the space SP has reached the maximum temperature, a user may start to use the pump 140 to manually develop pressure in the space SP in order to extrude the melted raw materials 200 out of the chamber 110 through the opening OP of the nozzle 120 to form the 3D printer filament 300. In other words, the temperature meter 152 reveals the appropriate moment for the user to start pumping.

(5) Manually increasing a pressure inside the chamber 110 to extrude the melted ground raw materials 200 out of the chamber 110 through the nozzle 120 to form a 3D printer filament 300 (Procedure 550). As shown in FIG. 1, a 3D printer filament 300 is being extruded from the chamber 110 through the nozzle 120.

(6) Cooling down the 3D printer filament 300 (Procedure 560). When the user turns on the switch 155 on the control panel 150, apart from controlling the heating element 130 to heat up, the controlling unit 151 also controls the fans 135 to start up. Through the cooling down of the 3D printer filament 300 by the fans 135 surrounding a vicinity of the opening OP of the nozzle 120, the user is avoided from touching the hot 3D printer filament 300.

(7) Delivering steam formed from heating the ground raw materials 200 to the cooling device 190 away from the chamber 110 through the heat-resistant exhaust hose 195 (Procedure 570). In this way, the hot steam is controlled in a safe way and the pressure in the space SP of the chamber 110 is avoided from getting too high.

(8) Activating the emergency switch 175 located at a bottom of the chamber 110 to shut off a supply of power configured for heating up the ground raw materials 200 when the emergency switch 175 is separated from the flat surface 400 (Procedure 580). During the operation of the portable 3D printer filament extruder for kids 100, when the emergency switch 175 is separated from the flat surface 400 intentionally or accidentally, the emergency switch 175 is free from compression and electrically disconnects the power supply 170 and the heating element 130 in an instant manner, which guarantees a safe usage of the portable 3D printer filament extruder for kids 100 in a proper position. Similarly, the electrical connection between the power supply 170 and the fans 135 is also disconnected at the same time.

In conclusion, the aforementioned embodiments of the present disclosure have at least the following advantages:

(1) Since the pump is a hand pump, the pressure in the chamber can be developed manually. Therefore, the 3D printer filament can be extruded out of the chamber through the opening of the nozzle in a manual way, which is suitable to be operated by kids.

(2) Since the pump is a hand pump, the overall size and weight of the portable 3D printer filament extruder for kids are effectively reduced. Therefore, the portable 3D printer filament extruder for kids is suitable to be portable.

(3) As a safety measure, the emergency switch electrically disconnects the power supply, the heating element and the fans in an instant manner when the emergency switch is separated from the flat surface such that the emergency switch is free from compression.

(4) Apart from the snapping between the first locking portion and the second locking portion, the thermal lock provides an additional security to prevent the second body from loosening from the first body to open the chamber when the temperature of the space has already increased.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A portable 3D printer filament extruder for kids, comprising:
   a chamber having a space configured to store raw materials;
   a nozzle connected with the chamber, the nozzle having an opening communicated with the space;
   a heating element disposed on the chamber and configured to heat up the raw materials in the space; and
   a pump connected with the chamber and configured to provide pressure to the space to extrude the heated raw materials out of the chamber through the opening in a form of filament.

2. The portable 3D printer filament extruder for kids of claim 1, wherein the pump is a hand pump.

3. The portable 3D printer filament extruder for kids of claim 1, wherein the chamber comprises:
   a first body connected with the nozzle, the heating element is disposed on the first body;
   a second body sealing the space together with the first body, the pump is connected with the second body; and
   a hinge connected between the first body and the second body.

4. The portable 3D printer filament extruder for kids of claim 3, wherein the chamber further comprises:
   a first locking portion comprising:
      a first hook;
      a first elastic element connected between the first hook and the first body; and
      a first conductive piece disposed on the first hook; and
   a second locking portion comprising:
      a second hook configured to snap with the first hook;
      a second elastic element connected between the second hook and the second body; and
      a second conductive piece disposed on the second hook and configured to contact with the first conductive piece when the second hook snaps with the first hook,
   the portable 3D printer filament extruder for kids further comprises:
   a controlling unit electrically connected with the first conductive piece, the second conductive piece and the heating element, the controlling unit is configured to control the heating element.

5. The portable 3D printer filament extruder for kids of claim 4, wherein the chamber further comprises:
   a thermal lock disposed on the first body and located in the space, the first locking portion is at least partially located between the thermal lock and the second locking portion, the thermal lock is configured to at least partially expand when the thermal lock reaches a predetermined temperature and press to secure the first hook to the second hook.

6. The portable 3D printer filament extruder for kids of claim 4, further comprising:
   a capacity sensor disposed at a level marker inside the first body and signally connected with the controlling unit, the capacity sensor being configured to provide a signal to the controlling unit when the raw materials exceed the level marker, wherein the controlling unit is restricted from turning on the heating element when receiving the signal.

7. The portable 3D printer filament extruder for kids of claim 3, further comprising:
   a temperature sensor disposed inside the first body and configured to detect a temperature in the chamber; and
   a temperature meter signally connected with the temperature sensor and configured to display a magnitude of the temperature detected by the temperature sensor.

8. The portable 3D printer filament extruder for kids of claim 3, further comprising:
   a power supply connected with the heating element;
   a frame, the first body being mounted on the frame;
   a plurality of supporting legs respectively connected with the frame and configured to be positioned on a flat surface; and
   at least one emergency switch disposed at an end of one of the supporting legs away from the frame, the emergency switch being electrically connected between the power supply and the heating element, the emergency switch being configured to electrically disconnect the power supply and the heating element when the emergency switch is free from compression.

9. The portable 3D printer filament extruder for kids of claim 8, further comprising:
   a plurality of fans disposed on the frame, the nozzle being at least partially located between the first body and the fans, the fans surrounding a vicinity of the opening, the fans being signally connected to the controlling unit, the controlling unit being further configured to control the fans, the emergency switch being electrically connected between the power supply and the fans, the emergency switch being configured to electrically disconnect the power supply and the fans when the emergency switch is free from compression.

10. The portable 3D printer filament extruder for kids of claim 3, further comprising:
   a cooling device; and
   a heat-resistant exhaust hose connected between the cooling device and the first body.

11. A method of forming 3D printer filament, comprising:
   putting ground raw materials into a chamber;
   closing the chamber;
   heating up to melt the ground raw materials; and
   manually increasing a pressure inside the chamber to extrude the melted ground raw materials out of the chamber through a nozzle to form a filament.

12. The method of claim 11, further comprising:
   cooling down the filament.

13. The method of claim 11, further comprising:
   delivering steam formed from heating the ground raw materials to a cooling device away from the chamber through a heat-resistant exhaust hose.

14. The method of claim 11, further comprising:
   displaying a magnitude of a temperature detected by a temperature sensor disposed inside the chamber.

15. The method of claim 11, further comprising:
   activating an emergency switch located at a bottom of the chamber to shut off a power supply configured for heating up the ground raw materials when the emergency switch is separated from a flat surface.

16. The method of claim 11, wherein the chamber comprises:
   a first locking portion comprising:
      a first hook elastically connected to the first body; and
      a first conductive piece disposed on the first hook; and a second locking portion comprising:

a second hook elastically connected to the second body and configured to snap with the first hook; and a second conductive piece disposed on the second hook and configured to contact with the first conductive piece when the second hook snaps with the first hook, closing the chamber comprises:

snapping the first hook to the second hook, such that the first conductive piece and the second conductive piece contact with each other to form a complete electric circuit with a controlling unit, heating up the ground raw materials comprises:

controlling by the controlling unit to heat up the ground raw materials after the complete electric circuit is formed.

17. The method of claim 16, wherein heating up the ground raw materials further comprises:

thermally expanding a thermal lock disposed inside the chamber, such that the thermal lock presses on the first locking portion to secure the snapping of the first locking portion to the second locking portion.

18. The method of claim 11, wherein putting the ground raw materials comprises:

sending a signal to a controlling unit by a capacity sensor disposed at a level marker inside the chamber when the ground raw materials exceed the level marker; and restricting from heating the ground raw materials when the controlling unit receives the signal.

* * * * *